(12) United States Patent
Ko et al.

(10) Patent No.: US 8,476,914 B2
(45) Date of Patent: Jul. 2, 2013

(54) CONCENTRATOR PHOTOVOLTAIC MEASURING DEVICE

(75) Inventors: Hsueh-Chao Ko, Longtan Township (TW); Cheng-Ban Chung, Longtan Township (TW); Chii-Neng Ou Yang, Longtan Township (TW); Yao-Tung Hsu, Longtan Township (TW)

(73) Assignee: Institute of Nuclear Energy Research, Atomic Energy Council, Executive Yuan (TW)

( * ) Notice: Subject to any disclaimer, the term of this patent is extended or adjusted under 35 U.S.C. 154(b) by 233 days.

(21) Appl. No.: 13/160,904

(22) Filed: Jun. 15, 2011

(65) Prior Publication Data

US 2012/0098558 A1    Apr. 26, 2012

(30) Foreign Application Priority Data

Oct. 26, 2010    (TW) ................................ 99136561 A

(51) Int. Cl.
*G01R 31/00*    (2006.01)
(52) U.S. Cl.
USPC .................... 324/750.03; 324/500; 324/76.11

(58) Field of Classification Search
None
See application file for complete search history.

(56) References Cited

U.S. PATENT DOCUMENTS 8,004,270 B2 *  8/2011  Kasahara et al. ............... 324/96
8,023,110 B1 *  9/2011  Ngai et al. .................. 356/237.1

* cited by examiner

*Primary Examiner* — Jermele M Hollington
*Assistant Examiner* — Trung Nguyen
(74) *Attorney, Agent, or Firm* — Schmeiser, Olsen & Watts LLP

(57) ABSTRACT

A concentrator photovoltaic measuring device includes a platform, an enclosing mask, a converging lens, a concentration unit, a first temperature regulation unit, a second temperature regulation unit, a temperature detection unit, a data transmission unit, and an electricity transmission unit. With its temperature regulation function, the concentrator photovoltaic measuring device simulates the effect of seasonal temperature variation on the energy conversion efficiency of a solar cell, so as to be effective in measuring the energy conversion efficiency of the solar cell in real environment and environment having a specific variable. Also, the concentrator photovoltaic measuring device accommodates a single solar cell, so as to be capable of measuring the single solar cell.

8 Claims, 6 Drawing Sheets

US 8,476,914 B2

CONCENTRATOR PHOTOVOLTAIC MEASURING DEVICE

CROSS-REFERENCE TO RELATED APPLICATION

This non-provisional application claims priority under 35 U.S.C. §119(a) on Patent Application No(s). 099136561 filed in Taiwan, R.O.C. on Oct. 26, 2010, the entire contents of which are hereby incorporated by reference.

FIELD OF TECHNOLOGY

The present invention relates to concentrator photovoltaic measuring devices, and more particularly, to a concentrator photovoltaic measuring device for testing the efficiency of the energy conversion of a solar cell efficiently in a real environment and in an environment with a specific variable and testing a single solar cell therein.

BACKGROUND

The notions of environmental protection, energy saving, and fighting against global warming are all the rage nowadays; hence, converting sunlight light energy into a usable form of energy with a solar cell is an emerging way of generating power. Among a wide variety of solar cells, a concentrator photovoltaic has the highest energy conversion rate and thus is regarded as an important option for large-scale solar power generation.

A concentrator photovoltaic works by focusing the sunlight on a solar cell by means of a converging lens to convert solar energy into electrical energy. However, focusing the sunlight with a converging lens always increases the temperature of the solar cell and the ambient temperature and, as a result, deteriorates the efficiency of photoelectric conversion. Hence, it is imperative to explore the effect of various concentrator photovoltaics on environmental condition, such as temperature or illumination, and evaluate the resultant variation in the efficiency of photoelectric conversion.

There is not any efficient conventional way of testing the efficiency of the energy conversion of a concentrator photovoltaic in a specific environmental condition. The conventional testing method requires adhering a temperature sensor to a heat-dissipating board beneath a concentrator photovoltaic. However, the temperature thus measured is the temperature of the heat-dissipating board rather than the temperature of a solar cell proper or the ambient temperature of the solar cell.

Furthermore, the conventional testing method applies to a real environment only. However, a real environment is always intricate and dependent on variables, including sunlight illumination, solar tracking angle, temperature, wind direction, etc., which have an effect on the result of the test of the efficiency of energy conversion. Environmental variables can vary to an extent great enough to let the environmental variables get out of control and make it difficult to test the solar cell. In addition, the conventional testing method always yields a test result typical of the dimensions of a large-scale system and thus is not applicable to the evaluation of the efficiency of the energy conversion of a single solar cell.

Accordingly, it is imperative to invent a concentrator photovoltaic measuring device for testing the efficiency of the energy conversion of a concentrator photovoltaic efficiently in a real environment and in an environment with a specific variable and testing a single solar cell therein.

SUMMARY

In view of the drawbacks of the conventional photovoltaic measuring device, the inventor of the present invention conducted extensive researches and experiments according to the inventor's years of experience in the related industry, and finally developed a concentrator photovoltaic measuring device for testing the efficiency of the energy conversion of a concentrator photovoltaic efficiently in a real environment and in an environment with a specific variable and testing a single solar cell therein.

It is a primary objective of the present invention to provide a concentrator photovoltaic measuring device having a temperature regulation function for simulating the effect of variation in seasonal temperature on the efficiency of the energy conversion of a solar cell and evaluating the efficiency of the energy conversion of the solar cell in a real environment and in an environment with a specific variable efficiently by preventing the excessive variation and complexity of the real environment.

Another objective of the present invention is to provide a concentrator photovoltaic measuring device for testing a single solar cell.

In order to achieve the above and other objectives, the present invention provides a concentrator photovoltaic measuring device comprising a platform, an enclosing mask, a converging lens, a concentration unit, a first temperature regulation unit, a second temperature regulation unit, a temperature detection unit, a data transmission unit, and a electricity transmission unit.

The platform comprises a test region. The enclosing mask encloses the platform and defines a receiving space and an upper opening. The test region of the platform is positioned inside the receiving space. A converging lens is mounted on the upper opening. A concentration unit is received in the receiving space and positioned above the test region. The concentration unit corresponds in position to the converging lens. A first temperature regulation unit is received in the receiving space and positioned beneath the test region. The first temperature regulation unit corresponds in position to the concentration unit. A second temperature regulation unit is disposed at the platform and enables thermal communication between the receiving space and the outside. A temperature detecting unit is received in the receiving space and positioned in the vicinity of the concentration unit, and has an output end which is disposed at the platform. A data transmission unit is disposed at the platform and electrically connected to the first temperature regulation unit and the second temperature regulation unit. The electricity transmission unit is received in the receiving space and has another end which is disposed at the platform.

A solar cell is positioned in the test region to correspond in position to the concentration unit. The solar cell is in contact with the first temperature regulation unit and is electrically connected to the electricity transmission unit.

Hence, the aforesaid architecture of the concentrator photovoltaic measuring device is not only effective in stabilizing the illumination, but also conducive to increasing or decreasing the temperature of the solar cell under test by means of the collaboration of the first temperature regulation unit and the second temperature regulation unit, so as to evaluate the efficiency of the energy conversion of the solar cell under test.

The aforesaid architecture of the concentrator photovoltaic measuring device fixes the temperature of the solar cell under test by means of the collaboration of the first temperature regulation unit and the second temperature regulation unit to enable the stabilization of temperature which is conducive to the efficient evaluation of the effect of illumination upon the solar cell under test.

The aforesaid architecture of the concentrator photovoltaic measuring device is capable of adjusting illumination to simulate the effect of seasonal environmental conditions upon the solar cell under test by means of the collaboration of the first temperature regulation unit and the second temperature regulation unit.

The test region can be designed to accommodate a single solar cell only, such that it is feasible to put a concentrator photovoltaic measuring device under a real environmental condition in order to test and determine whether a required standard of energy conversion efficiency is met by the solar cells of different models or even different lot numbers.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION

Figure 1:
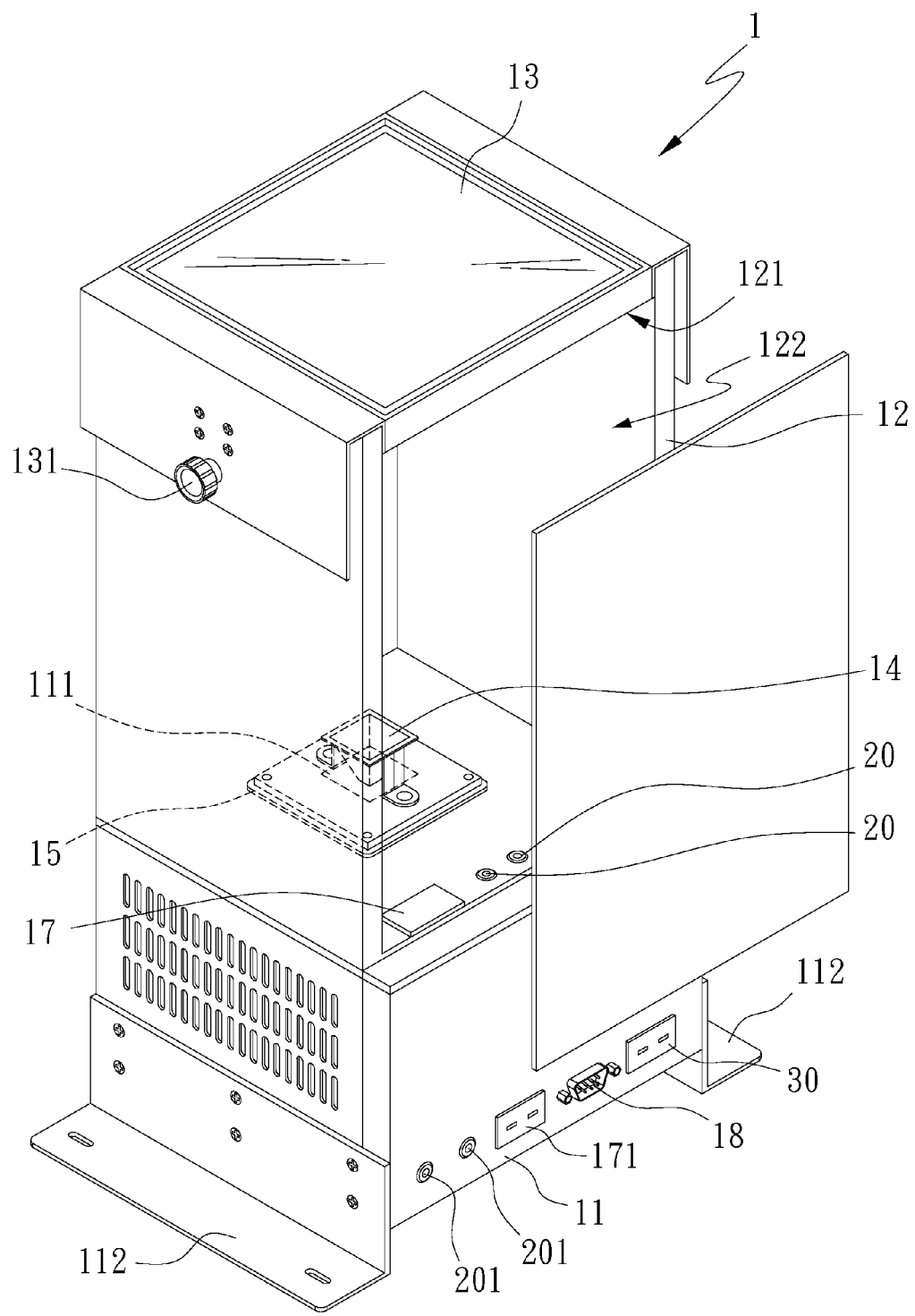
FIG. 1 is a perspective view of a concentrator photovoltaic measuring device according to a preferred specific embodiment of the present invention.
Figure 2:
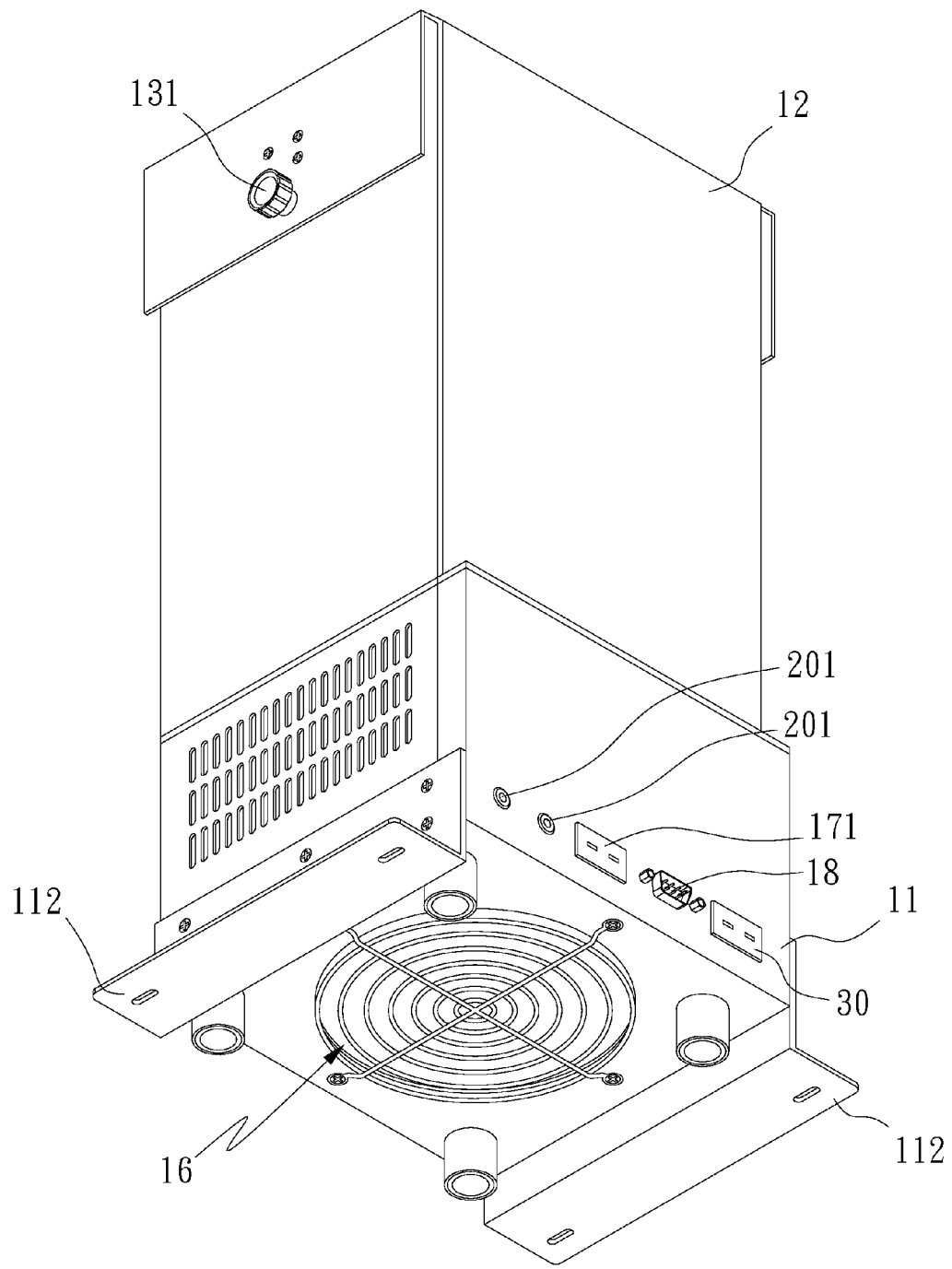
FIG. 2 is a perspective view of the concentrator photovoltaic measuring device from another viewing angle according to a preferred specific embodiment of the present invention.
Figure 3:
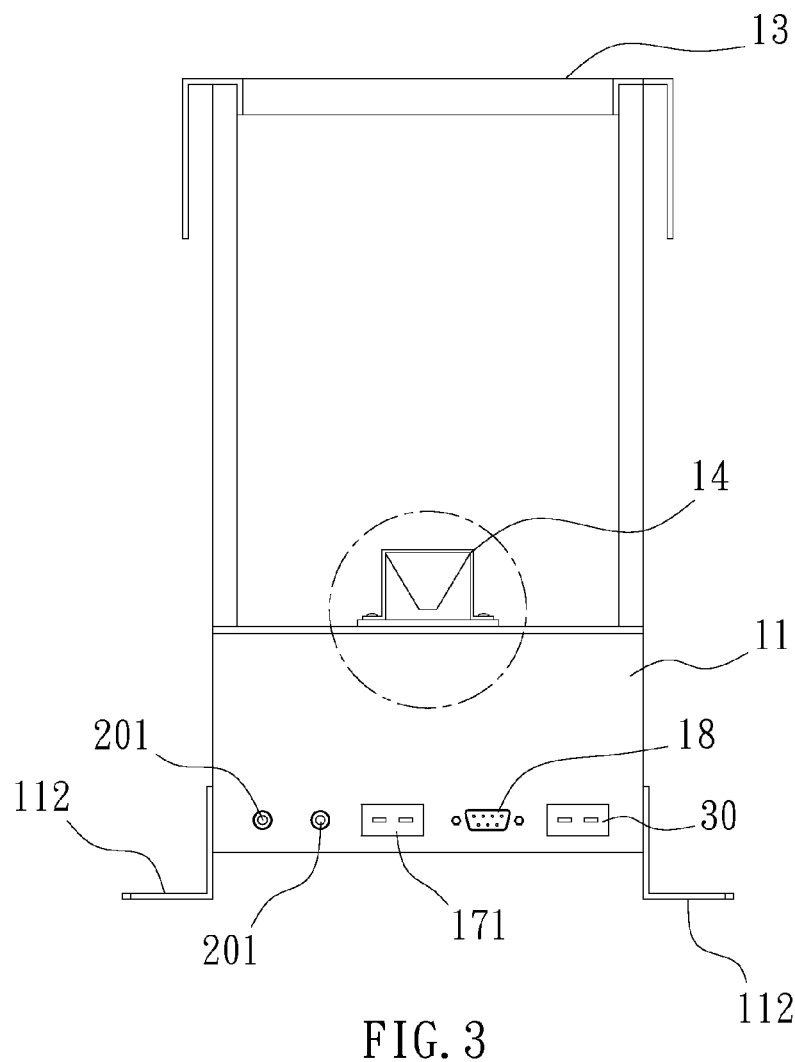
FIG. 3 is a cross-sectional view of the concentrator photovoltaic measuring device according to a preferred specific embodiment of the present invention.
Figure 4:
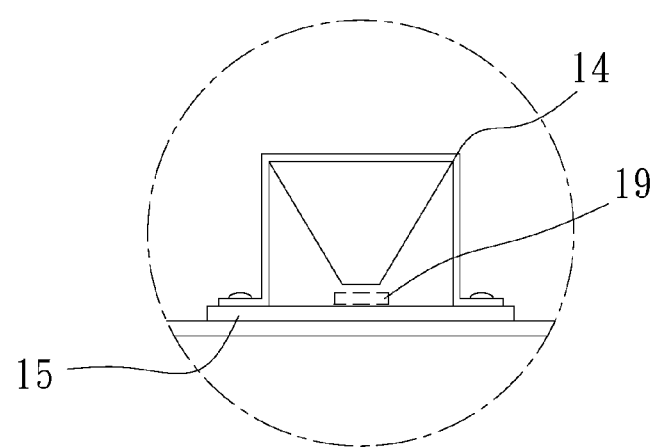
FIG. 4 is an enlarged view of a concentration unit, a first temperature regulation unit, and a solar cell of the concentrator photovoltaic measuring device shown in FIG. 3 according to a preferred specific embodiment of the present invention.
Figure 5:
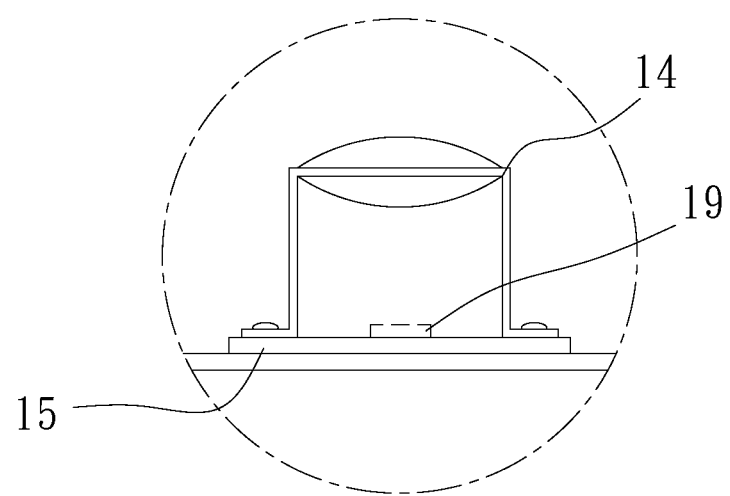
FIG. 5 is an enlarged view of the concentration unit, the first temperature regulation unit, and the solar cell of the concentrator photovoltaic measuring device shown in FIG. 3 according to another preferred specific embodiment of the present invention.
Figure 6:
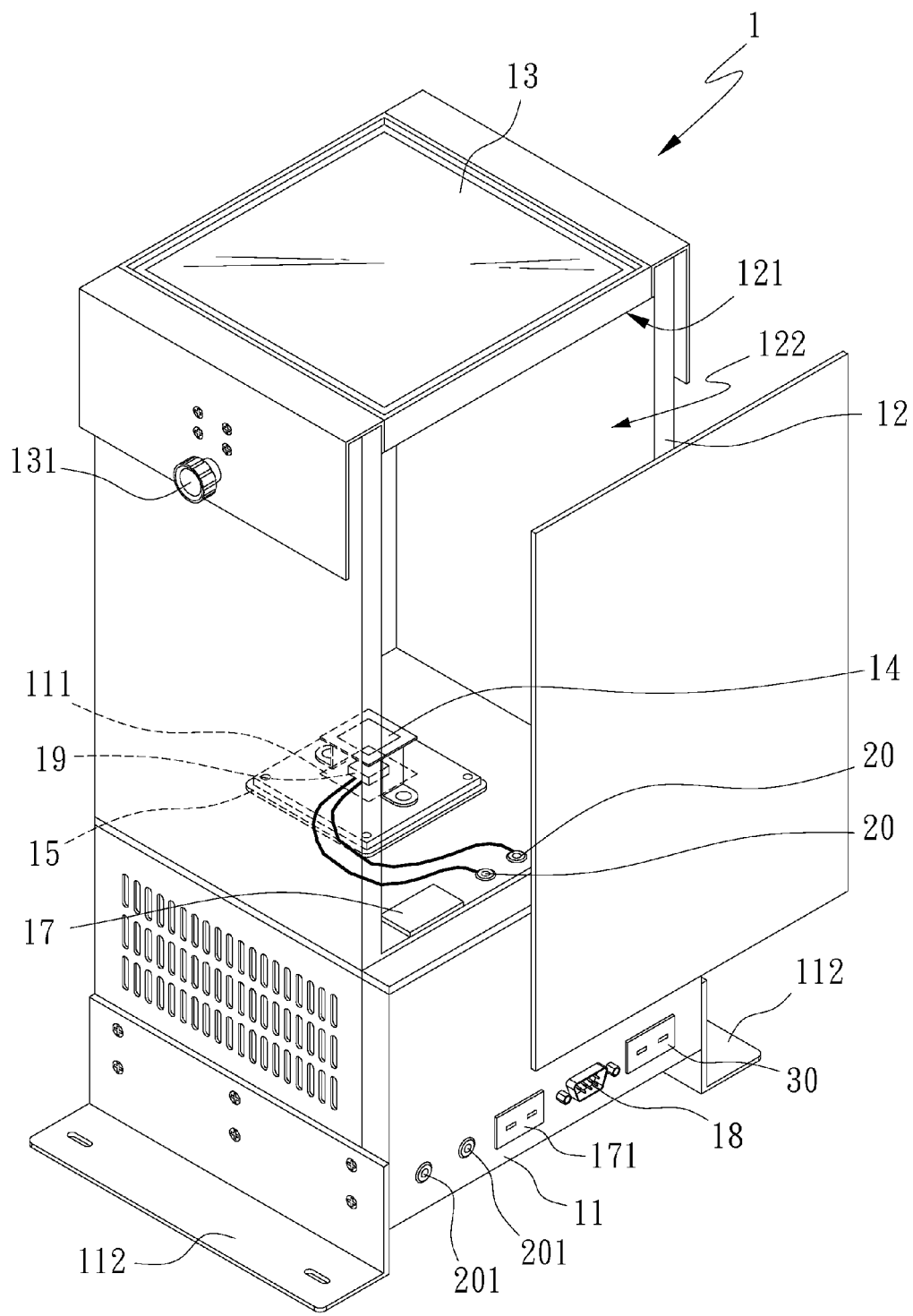
FIG. 6 is a schematic view of the concentrator photovoltaic measuring device according to another preferred specific embodiment of the present invention.

Referring to FIG. 1 through FIG. 6, there are shown in FIG. 1 a perspective view of a concentrator photovoltaic measuring device according to a preferred specific embodiment of the present invention, in FIG. 2 a perspective view of the concentrator photovoltaic measuring device from another viewing angle according to a preferred specific embodiment of the present invention, in FIG. 3 a cross-sectional view of the concentrator photovoltaic measuring device according to a preferred specific embodiment of the present invention, in FIG. 4 an enlarged view of a concentration unit, a first temperature regulation unit, and a solar cell of the concentrator photovoltaic measuring device shown in FIG. 3 according to a preferred specific embodiment of the present invention, in FIG. 5 an enlarged view of the concentration unit, the first temperature regulation unit, and the solar cell of the concentrator photovoltaic measuring device shown in FIG. 3 according to another preferred specific embodiment of the present invention, and in FIG. 6 a schematic view of the concentrator photovoltaic measuring device according to another preferred specific embodiment of the present invention.

FIG. 6 is a schematic view of the concentrator photovoltaic measuring device according to another preferred specific embodiment of the present invention. As shown in FIG. 6, a concentrator photovoltaic measuring device 1 comprises a platform 11, an enclosing mask 12, a converging lens 13, a concentration unit 14, a first temperature regulation unit 15, a second temperature regulation unit 16, a temperature detection unit 17, a data transmission unit 18, and an electricity transmission unit 20.

As shown in the drawings, the platform 11 comprises a test region 111. In this embodiment, the platform 11 further comprises two angle plates 112 for fixing the platform 11 in place.

As shown in the drawings, the enclosing mask 12 encloses the platform 11 for defining a receiving space 122 and an upper opening 121, and the test region 111 of the platform 11 is positioned inside the receiving space 122. The test region 111 accommodates a solar cell 19 in a manner that the solar cell 19 accurately receives the sunlight concentrated by the concentration unit 14. In this embodiment, the enclosing mask 12 is made of a thermally insulating, opaque material.

As shown in the drawings, the converging lens 13 is mounted on the upper opening 121 defined by the enclosing mask 12. In this embodiment, the converging lens 13 further comprises a fine tuning device 131 for adjusting the angle of the converging lens 13 to focus the sunlight on the concentration unit 14 accurately.

As shown in the drawings, the concentration unit 14 is received in the receiving space 122 defined by the enclosing mask 12 and positioned above the test region 111 of the platform 11, and the concentration unit 14 corresponds in position to the converging lens 13. In this embodiment, the concentration unit 14 is a funnel-shaped metallic device. In another embodiment of the present invention, the concentration unit 14 is a convex lens structure (as shown in FIG. 5).

Also, as shown in the drawings, the first temperature regulation unit 15 is received in the receiving space 122 defined by the enclosing mask 12 and positioned beneath the test region 111 of the platform 11, and the first temperature regulation unit 15 corresponds in position to the concentration unit 14. The second temperature regulation unit 16 is mounted on the platform 11 and enables thermal communication between the receiving space 122 defined by the enclosing mask 12 and the outside. In this embodiment, the first temperature regulation unit 15 is a semiconductor temperature-controlling device, and the second temperature regulation unit 16 is a cooling fan.

Furthermore, as shown in the drawings, the temperature detecting unit 17 is received in the receiving space 122 defined by the enclosing mask 12 and positioned in the vicinity of the concentration unit 14. The temperature detecting unit 17 is a thermal couple for detecting the temperature of the receiving space 122 directly. If the solar cell 19 under test has a thermal couple, the temperature detecting unit 17 can also be connected to the thermal couple of the solar cell 19 for detecting the temperature of the solar cell 19 directly. The temperature detecting unit 17 further comprises an output end 171 which is disposed at the platform for outputting to the outside a data related to the detected temperature (such as a detected temperature level). The data transmission unit 18 is disposed at the platform 11 and electrically connected to the first temperature regulation unit 15 and the second temperature regulation unit 16. The data transmission unit 18 receives a control signal for meeting the need for different test conditions and controlling the first temperature regulation unit 15 and the second temperature regulation unit 16 so as to fix, increase, or decrease the temperature. The electricity transmission unit 20 is received in the receiving space 122. The electricity transmission unit 20 comprises a power output end 201 which is disposed at the platform. The electricity transmission unit 20 is electrically connected to the solar cell 19 so as to output electrical current and voltage to the outside through the power output end 201.

To test the solar cell 19, it is necessary to have the solar cell 19 received in the test region 111 of the platform 11 faced with the concentration unit 14, and the solar cell 19 must be in contact with the first temperature regulation unit 15 and in electrical connection with the electricity transmission unit 20. For instance, to test the efficiency of energy conversion of the solar cell 19 at a constant illumination level but different temperatures, it is necessary for the data transmission unit 18 to receive the control signal through an external host computer 50 (see FIG. 7) for controlling the first temperature regulation unit 15 and the second temperature regulation unit 16 and thus keeping the temperature at 10° C., 20° C., 30° C., 40° C. or 50° C., and it is also necessary that the host computer 50 compares the temperature levels detected and received from the temperature detecting unit 17 to determine whether to resend the control signal; meanwhile, the electrical current and voltage outputted from the power output end 201 of the electricity transmission unit 20 at different temperature levels are recorded, so as to calculate the energy conversion efficiency of the solar cell 19 at a specific temperature (such as 25° C. which is the normal temperature at which a typical test is performed.) The aforesaid electrical current and voltage are recorded either by the host computer 50 or by another recorder.

In addition, an another specific embodiment of the present invention, the concentrator photovoltaic measuring device 1 further comprises a second temperature detection unit 30. The second temperature detection unit 30 is mounted on the platform, connected to the first temperature regulation unit 15, and adapted to measure the temperature of the first temperature regulation unit 15. The second temperature detection unit 30 can also output a temperature level to a host computer for the reference of temperature adjustment.

Figure 7:
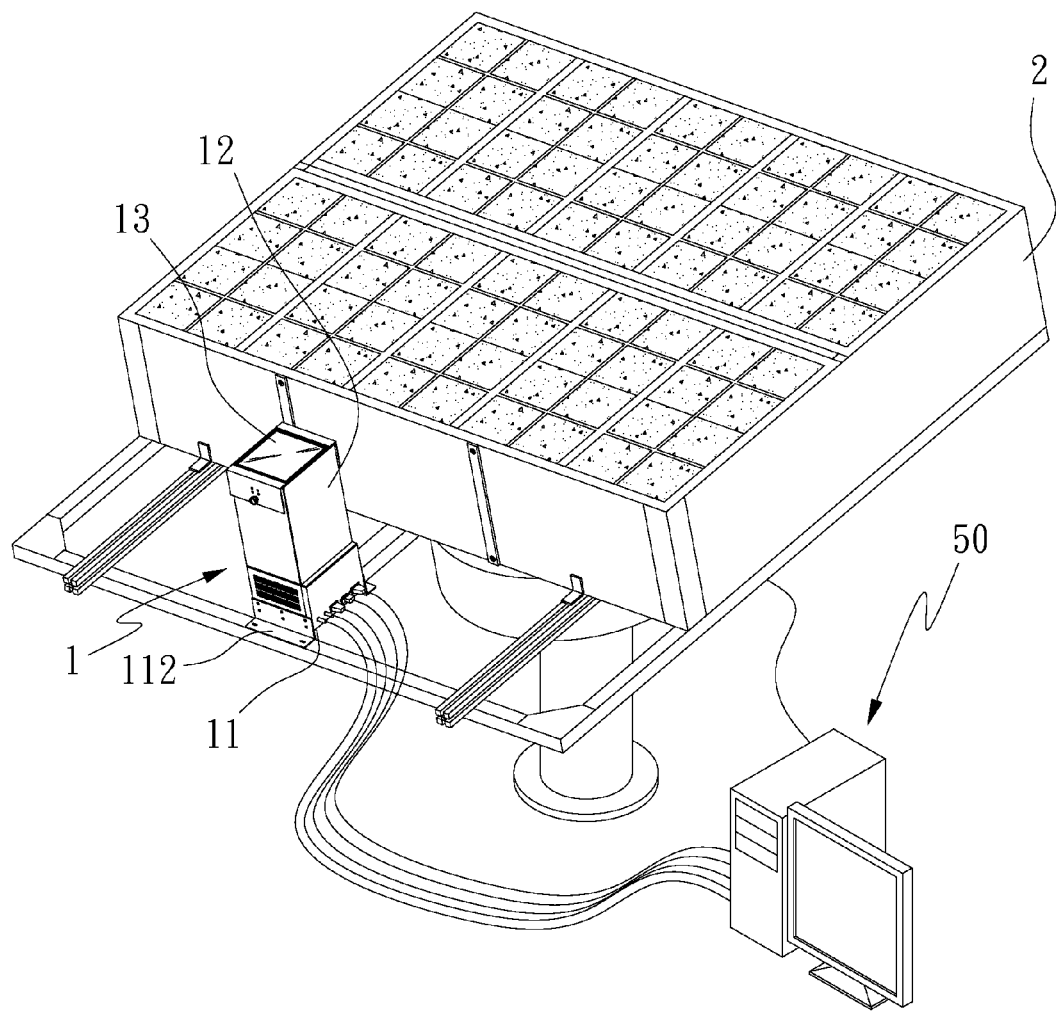
FIG. 7 is a schematic view of application of the concentrator photovoltaic measuring device according to a preferred specific embodiment of the present invention.

Referring to FIG. 1 through FIG. 7, there is shown in FIG. 7 a schematic view of application of the concentrator photovoltaic measuring device according to a preferred specific embodiment of the present invention.

As shown in FIG. 7, the concentrator photovoltaic measuring device 1 is disposed at a solar power device 2. The concentrator photovoltaic measuring device 1 is fixed to the solar power device 2 by means of the angle plates 112 of the platform 11.

In practice, the converging lens 13 focuses the sunlight on the concentration unit 14 accurately, and then the concentration unit 14 guides the focused sunlight to the solar cell 19 where photoelectric conversion takes place; meanwhile, the electrical current and voltage generated by the solar cell 19 and the data related to the temperature detected by the temperature detecting unit 17 are sent from the electricity transmission unit 20 to the outside.

According to the present invention, the converging lens 13 further comprises the fine tuning device 131 for fine-tuning the converging lens 13 and fixing the angle of the converging lens 13 to focus the sunlight on the concentration unit 14 and the solar cell 19, and it is feasible to increase or decrease the temperature of the solar cell 19 under test by means of the collaboration of the first temperature regulation unit 15 and the second temperature regulation unit 16 with a view to evaluating the energy conversion efficiency of the solar cell 19 under test.

According to the present invention, it is feasible to fix the temperature of the solar cell 19 under test by means of the collaboration of the first temperature regulation unit 15 and the second temperature regulation unit 16, so as to evaluate the effect of illumination on the solar cell 19 under test.

According to the present invention, it is feasible to adjust a plurality of illumination levels by means of the collaboration of the first temperature regulation unit 15 and the second temperature regulation unit 16, so as to simulate the effect of seasonal environmental conditions on the solar cell 19 under test.

The test region 111 of the platform 11 can be designed to accommodate one said solar cell 19 only, such that it is feasible to put the concentrator photovoltaic measuring device 1 under a real environmental condition in order to test and determine whether a required standard of energy conversion efficiency is met by the solar cells 19 of different models or even different lot numbers.

Furthermore, as shown in FIG. 7, the concentrator photovoltaic measuring device 1 operates in conjunction with the solar power device 2, such that the host computer 50 senses the temperature of the solar power device 2, sends a control signal to the data transmission unit 18, and receives a temperature-related data (regarding a temperature level, for example) from the temperature detecting unit 17. As a result, not only can the concentrator photovoltaic measuring device 1 and the solar power device 2 be synchronized in terms of temperature, but it is efficient to measure the current and voltage outputted from the electricity transmission unit 20 with a view to evaluating the efficiency of the energy conversion of the solar cell 19 in a simulated operating environment of the solar power device 2. Hence, the present invention meets the three requirements of patentability, namely novelty, non-obviousness, and industrial applicability. Regarding novelty and non-obviousness, the present invention discloses that the concentrator photovoltaic measuring device has a temperature regulation function for simulating the effect of seasonal temperature variation on the energy conversion efficiency of a solar cell, so as to be effective in measuring the energy conversion efficiency of the solar cell in real environment and environment having a specific variable and capable of measuring a single solar cell therein. Regarding industrial applicability, products derived from the present invention meet existing market demands fully.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A concentrator photovoltaic measuring device, comprising:
    a platform comprising a test region;
    an enclosing mask enclosing the platform and defining a receiving space and an upper opening, wherein the test region is positioned inside the receiving space;
    a converging lens mounted on the upper opening;
    a concentration unit received in the receiving space and positioned above the test region, the concentration unit corresponding in position to the converging lens;

a first temperature regulation unit received in the receiving space and positioned beneath the test region, the first temperature regulation unit corresponding in position to the concentration unit;
a second temperature regulation unit disposed at the platform for enabling thermal communication between the receiving space and an outside;
a temperature detection unit received in the receiving space, positioned in vicinity of the concentration unit, and having an output end disposed at the platform;
a data transmission unit disposed at the platform and electrically connected to the first temperature regulation unit and the second temperature regulation unit; and
an electricity transmission unit received in the receiving space and having a power output end disposed at the platform.

2. The concentrator photovoltaic measuring device of claim 1, wherein the enclosing mask is made of a thermally insulating, opaque material.

3. The concentrator photovoltaic measuring device of claim 1, wherein the converging lens further comprises a fine tuning device.

4. The concentrator photovoltaic measuring device of claim 1, wherein the concentration unit is a funnel-shaped metallic device.

5. The concentrator photovoltaic measuring device of claim 1, wherein the concentration unit is a convex lens.

6. The concentrator photovoltaic measuring device of claim 1, wherein the first temperature regulation unit is a semiconductor temperature-controlling device.

7. The concentrator photovoltaic measuring device of claim 1, wherein the second temperature regulation unit is a cooling fan.

8. The concentrator photovoltaic measuring device of claim 1, further comprising a second temperature detection unit mounted on the platform and connected to the first temperature regulation unit.

* * * * *